(12) United States Patent
Suzuki et al.

(10) Patent No.: US 9,115,860 B2
(45) Date of Patent: Aug. 25, 2015

(54) INTERIOR LAMP FOR VEHICLE

(75) Inventors: Yasuo Suzuki, Shizuoka (JP); Yuta Masuda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 13/978,083

(22) PCT Filed: Jan. 31, 2012

(86) PCT No.: PCT/JP2012/052576
§ 371 (c)(1),
(2), (4) Date: Jul. 2, 2013

(87) PCT Pub. No.: WO2012/111461
PCT Pub. Date: Aug. 23, 2012

(65) Prior Publication Data
US 2014/0029286 A1    Jan. 30, 2014

(30) Foreign Application Priority Data

Feb. 16, 2011    (JP) .................................. 2011-031188

(51) Int. Cl.
*B60Q 1/26*    (2006.01)
*F21S 8/10*    (2006.01)
*B60Q 3/02*    (2006.01)

(52) U.S. Cl.
CPC ............... *F21S 48/00* (2013.01); *B60Q 3/0296* (2013.01)

(58) Field of Classification Search
CPC ............................ B60Q 3/004; B60Q 13/0225
USPC ......................................................... 362/488
See application file for complete search history.

(56) References Cited

U.S. PATENT DOCUMENTS

| 5,345,372 A | 9/1994 | Takano et al. |
| 6,325,526 B1 | 12/2001 | Yabata et al. |
| 8,425,093 B2 * | 4/2013 | Kino et al. ..................... 362/490 |
| 2002/0041496 A1 | 4/2002 | Hatagishi et al. |

(Continued)

FOREIGN PATENT DOCUMENTS

| CN | 1078030 A | 11/1993 |
| CN | 1636796 A | 7/2005 |

(Continued)

OTHER PUBLICATIONS

International Search Report and Written Opinion of the International Search Report for PCT/JP2012/052576 dated Jun. 5, 2012.

(Continued)

*Primary Examiner* — Anabel Ton
(74) *Attorney, Agent, or Firm* — Kenealy Vaidya LLP

(57) ABSTRACT

An interior lamp includes a design portion and a function portion. A circuit board is attached to the function portion. A light source is mounted on the circuit board. Terminals are mounted on a side portion of the circuit board. A connector is disposed on a side portion of the function portion. Connector terminals are provided on the connector. A switch has a switch knob and a switch body. The switch knob is attached to a side portion of the design portion. The switch body is attached to the side portion of the function portion. The switch knob and the switch body are operated in an interlocked manner to perform electrical connection between the terminals and the connector terminals selectively so as to perform a tuning on or off of the light source.

5 Claims, 11 Drawing Sheets

(56) References Cited

U.S. PATENT DOCUMENTS

| | | |
|---|---|---|
| 2004/0109324 A1 | 6/2004 | Tiesler et al. |
| 2004/0179370 A1* | 9/2004 | Nagai et al. .................. 362/488 |
| 2005/0133355 A1 | 6/2005 | Shimoda et al. |
| 2005/0133357 A1 | 6/2005 | Shimoda et al. |
| 2005/0136718 A1 | 6/2005 | Okano et al. |
| 2007/0139944 A1* | 6/2007 | Nagai .......................... 362/488 |
| 2011/0280027 A1* | 11/2011 | Takasaki ...................... 362/488 |

FOREIGN PATENT DOCUMENTS

| | | | |
|---|---|---|---|
| CN | 1637981 | A | 7/2005 |
| DE | 102004061526 | A1 | 7/2005 |
| FR | 2 444 589 | A1 | 7/1980 |
| GB | 2 263 972 | A | 8/1993 |
| JP | 2003-137027 | A | 5/2003 |
| JP | 2005-183822 | A | 7/2005 |
| JP | 2008-4273 | A | 1/2008 |
| KR | 2002-0048782 | A | 6/2002 |

OTHER PUBLICATIONS

Korean Office Action for the related Korean Patent Application No. 10-2013-7021216 dated Jun. 27, 2014.
Japanese Office Action for the related Japanese Patent Application No. 2011-031188 dated Sep. 9, 2014.
Office Action from German Patent App. No. 11 2012 000 842.1 (Dec. 11, 2014) with English language translation thereof.
Office Action from Chinese Patent App. No. 201280009381.9 (Jan. 26, 2015) with English language translation thereof.
Office Action from Japanese Patent App. No. 2011-031188 (Apr. 8, 2015) with English language translation thereof.

* cited by examiner

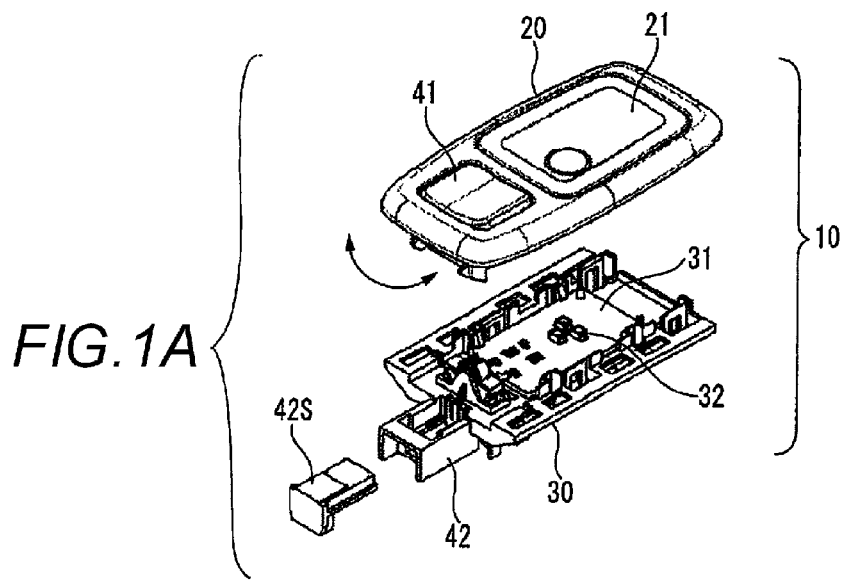
*FIG.1A*
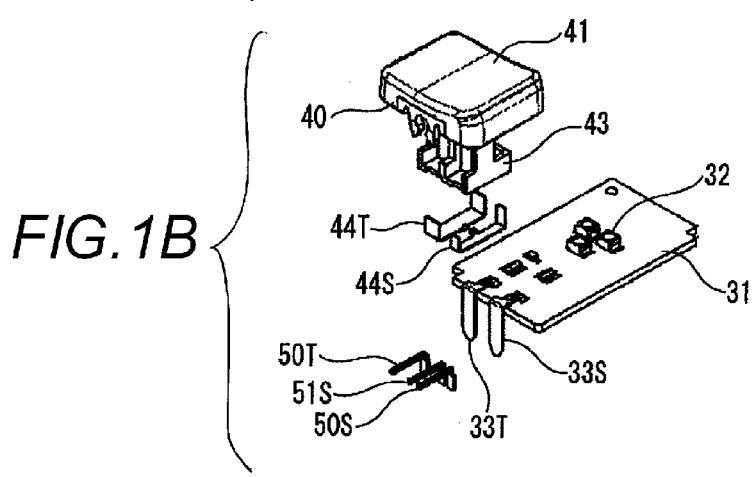
*FIG.1B*
*FIG.1C*  *FIG.1D*
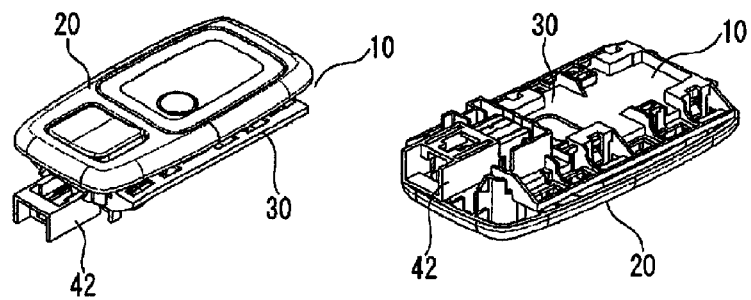

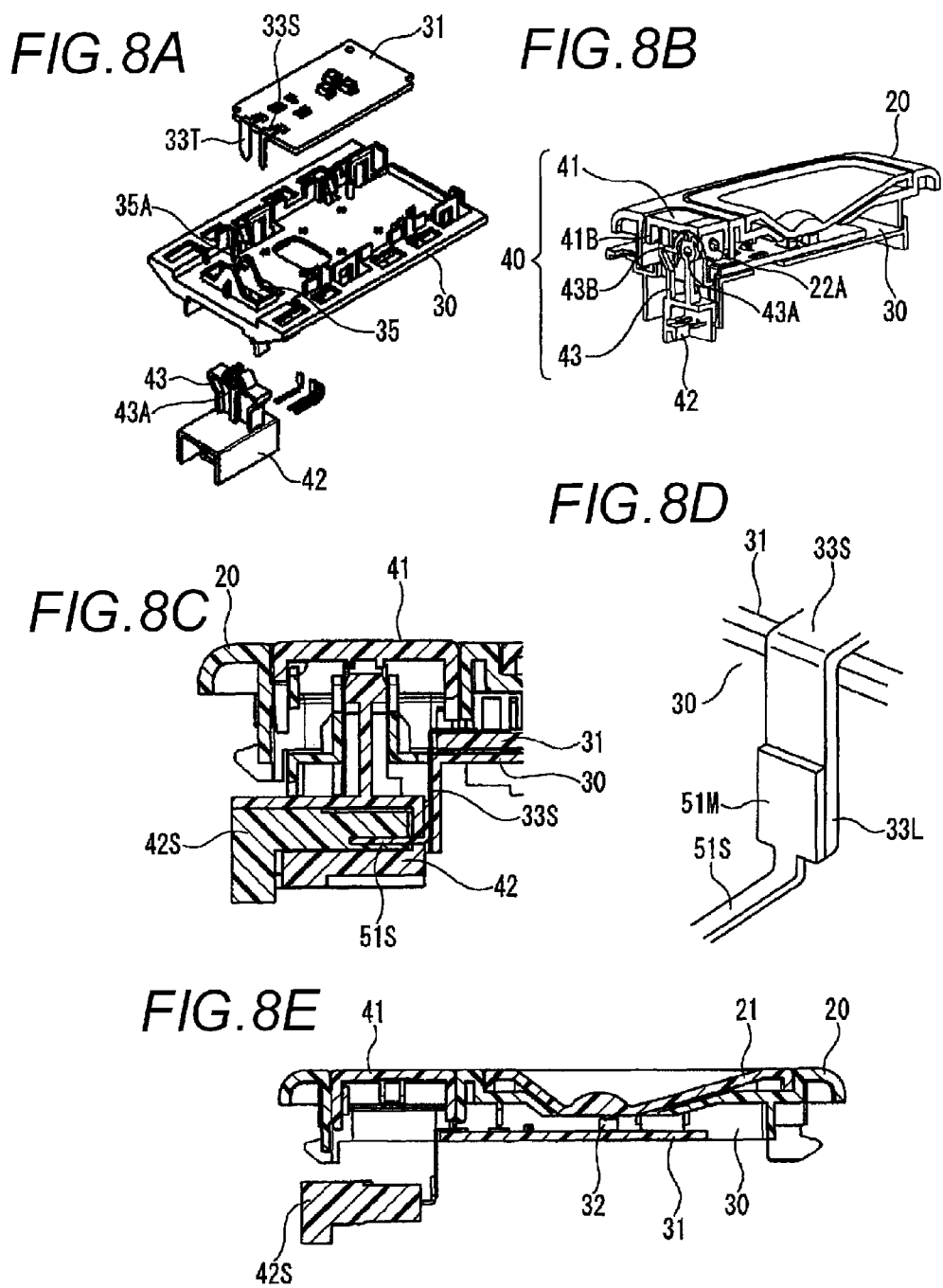

INTERIOR LAMP FOR VEHICLE

This application is a U.S. national phase filing under 35 U.S.C. §371 of PCT Application No. PCT/JP2012/052576, filed Jan. 31, 2012, and which in turn claims priority under 35 U.S.C. §119 to Japanese Patent Application No. JP2011-031188, filed Feb. 16, 2011, the entireties of which are incorporated by reference herein.

TECHNICAL FIELD

The present invention relates to an interior lamp for a vehicle to be attached to a partition plate (such as a ceiling plate or the interior plate of a door) for partitioning a vehicle room.

BACKGROUND ART

<Interior Lamp for Vehicle Described in PTL (Patent Literature) 1>

The switch structure for controlling the turning-on/off of an interior lamp for a vehicle has been known. According to the structure, the turning-on/off of the switch is performed by pushing the pushing portion of a switch knob attached to a switch panel so as to be rotatable freely to thereby pushdown a tact switch mounted on a wiring board.

CITATION LIST

Patent Literature

[PTL 1] JP-A-2008-4273
<Problem of the Technique Described in PT 1>

The interior lamp for a vehicle described in PT 1 has a problem that it is difficult to arrange the switch and a circuit board to which light sources etc. are mounted and also the configuration of the switch is complicated.

SUMMARY OF INVENTION

Technical Problem

This invention is made in view of the aforesaid circumstance and an object of this invention is to provide an interior lamp for a vehicle which can secure suitable illumination within the vehicle room, assemble respective components easily, reduce the number of the components and hence is excellent in cost performance.

Solution to Problem

In order to attain the aforesaid object, the interior lamp for a vehicle according to this invention has the following features (1) to (5).
(1) An interior lamp for a vehicle, comprising:
a design portion;
a function portion;
a lens which is attached to the design portion;
a circuit board which is attached to the function portion;
a light source which is mounted on the circuit board so as to be close to the lens;
a plurality of terminals which are mounted on a side portion of the circuit board so as to be extended down from the side portion of the circuit board;
a connector which is disposed on a side portion of the function portion;
a plurality of connector terminals which are provided on the connector; and
a switch which has a switch knob and a switch body,
wherein the switch knob is attached to a side portion of the design portion so as to be driven freely;
wherein the switch body is attached to the side portion of the function portion so as to be driven freely; and
wherein the switch knob and the switch body are operated in an interlocked manner to perform electrical connection between the terminals and the connector terminals selectively so as to perform a tuning on or off of the light source.
(2) The interior lamp according to (1), wherein the switch body and the connector are integrally formed, and the switch knob, the switch body and the connector are operated in an interlocked manner.
(3) The interior lamp according to (1), wherein a plurality of contacts are provided on a bottom portion of the switch body to electrically connect the terminals and the connector terminals via the contacts.
(4) The interior lamp according to any one of (1) to (3), wherein the switch knob is attached to the design portion so as to be rotatable freely, and the switch body is attached to the function portion so as to be rotatable freely.
(5) The interior lamp according to any one of (1) to (3), wherein the switch knob is attached to the design portion so as to be movable freely in a horizontal direction, and the switch body is attached to the function portion so as to be movable freely in the horizontal direction.

According to the configuration recited in (1), each of the lens and the switch knob is disposed on the design portion, and each of the switch body, the circuit board mounting the light source thereon and the connector is disposed on the function portion, so that the assembling procedure can be quite facilitated. Further, the switch knob, the switch body, the terminals and the connector terminals are disposed at the side portion of the circuit board so as to be separated from the engaging or fixing position of the circuit board, the light source mounted on the circuit board can be made close to the lens, whereby the excellent interior illumination can be secured.

According to the configuration recited in (2), since the switch body and the connector are integrally formed, the number of the components can be reduced and the cost can be lowered.

According to the configuration recited in (3), since the switching of the switch is performed via the contacts, each of the number of the terminals fixed to the circuit board and the number of the connector terminals fixed to the connector can be selected freely.

According to the configuration recited in (4), the switch can be switched smoothly by the rotating operation.

According to the configuration recited in (5), the switch can be switched smoothly by the moving operation in the horizontal direction.

Advantageous Effects of Invention

According to this invention, each of the lens and the switch knob is disposed on the design portion, and each of the circuit board mounting the light source thereon, the switch body and the connector is disposed on the function portion, whereby the entire configuration can be simplified and the improvement of the operability can be realized. Further, since the switch and the electric coupling components incidental thereto are disposed at the side portion of the circuit board so as not to influence on the engaging and fixing procedure of the circuit board, the light source and the lens can be disposed with excellent arrangement relation and so suitable illumination can be secured. Furthermore, since the terminals fixed to the circuit board are used as elements performing a part of the switching function, the interior lamp for a vehicle having the reduced number of the components and excellent in the cost performance can be provided without requiring a switch on the market.

BRIEF DESCRIPTION OF DRAWINGS

FIG. 1A shows an exploded perspective view of an interior lamp for a vehicle according to a first embodiment of the invention, FIG. 1B is an exploded perspective view of a switch and a circuit board, FIG. 1C is a perspective view of the front side of the interior lamp, and FIG. 1D is a perspective view of the rear side of the interior lamp;

FIG. 8A is an exploded perspective view mainly showing a function portion as the main constituent elements of the interior lamp shown in FIGS. 7A to 7D, FIG. 8B is a sectional perspective view of the switch showing the movement of the switch, FIG. 8C is a sectional view of the switch, FIG. 8D is an enlarged perspective view of the electrical connecting components, and FIG. 8E is a longitudinal sectional view of the interior lamp;

FIGS. 9A to 9D show the turned-on state of the switch shown in FIGS. 7A to 7D, in which FIG. 9A is a longitudinal sectional view of the interior lamp, FIG. 9B is a sectional view along a line A-A of FIG. 9A, FIG. 9C is a perspective view showing the electrical connecting components, and FIG. 9D is a perspective view of the switch and FIGS. 9E to 9H shows the turned-off state of the switch in which FIG. 9E is a longitudinal sectional view of the interior lamp, FIG. 9F is a sectional view along a line B-B of FIG. 9E, FIG. 9G is a perspective view showing the electrical connecting components, and FIG. 9H is a perspective view of the switch;

FIGS. 10B to 10D show the turned-on state of the switch wherein FIG. 10B is a sectional view of the terminal side of the switch, FIG. 10C is a sectional view of the connector terminal side of the switch, and FIG. 10D is a perspective view showing the electrical connecting components and FIG. 10E to 10G show the turned-off state of the switch wherein FIG. 10E is a sectional view of the terminal side of the switch, FIG. 10F is a sectional view of the connector terminal side of the switch and FIG. 10G is a perspective view showing the electrical connecting components; FIGS. 11B and 11C show the turned-on state of a switch wherein FIG. 11B is a sectional view of the terminal side of the switch and FIG. 11C is a perspective view showing the electrical connecting components, and FIGS. 11D and 11E show the turned-off state of the switch wherein FIG. 11D is a sectional view of the terminal side of the switch and FIG. 11E is a perspective view showing the electrical connecting components.

DESCRIPTION OF EMBODIMENTS

First Embodiment

Figure 2A:
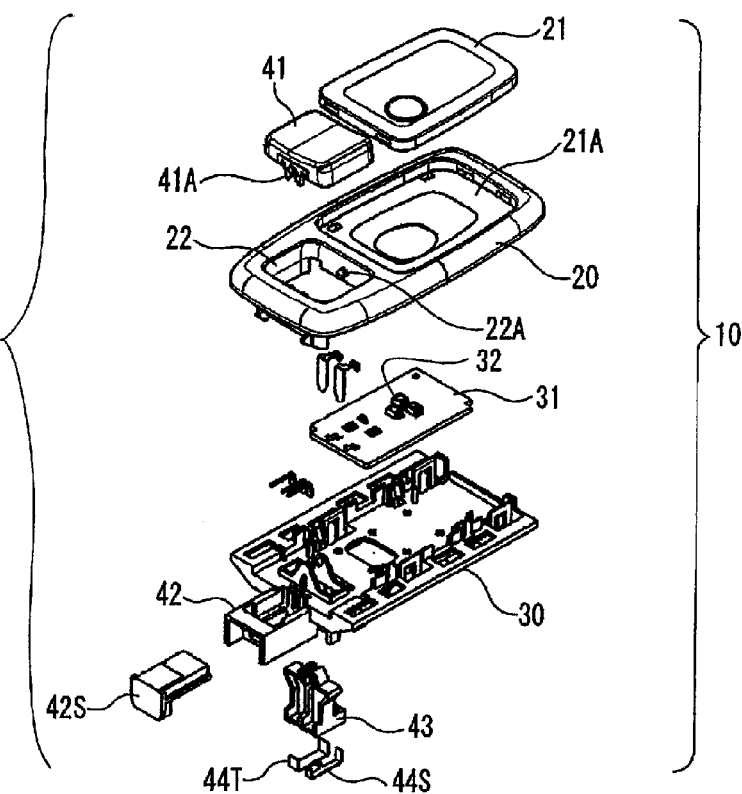
FIG. 2A is an exploded perspective view of the interior lamp shown in FIG. 1A.

Hereinafter, preferable embodiments of an interior lamp for a vehicle according to this invention will be explained in detail with reference to drawings.
<Configuration of First Embodiment>

The interior lamp 10 for a vehicle according to the first embodiment of this invention will be explained based on FIGS. 1A to 1D.

The interior lamp 10 for a vehicle of this embodiment is attached to a partition plate (such as a ceiling plate or the interior plate of a door: not shown) for partitioning the room of a vehicle and is briefly configured by a design portion 20 of an almost rectangular shape and a function portion 30 of an almost rectangular shape which is engaged with and fixed to the design portion 20. A lens 21 is attached to the center portion of the design portion 20 and the switch knob 41 of a switch 40 is attached to the side portion of the design portion 20 so as to be driven freely (hereinafter, referred as rotatable freely in the first and second embodiments).

A circuit board 31 is assembled at the center portion of the function portion 30. A first connector 42 of a female type formed as a unit or in an integrated manner with the function portion 30 is provided at the one end of the function portion 30. A switch body 43 is attached so as to be rotatable freely at the side portion of the function portion 30 between the first connector 42 and the lens 21. Further, the first connector 42 is fit with a second connector 42S of a male type which is inserted from the tip end of the first connector 42.

In the first embodiment, the switch 40 is configured by the switch knob 41 and the switch body 43. A pair of contacts 44S, 44T, each formed in a U-shape in a manner that the both ends thereof are bent in a perpendicular direction, and are attached to the bottom portion of the switch body 43. The first contact 44S is formed to have a narrow width, whilst the second contact 44T is formed to have a width larger than that of the first contact 44S.

A plurality of light sources 32 (LED, EL etc.) are attached near the center of the circuit board 31. A pair of L-shaped terminals 33S, 33T, each of which is electrically connected to a circuit (not shown) mounted on the circuit board 31 and extends downward (hangs down), are fixed to the end portion of the circuit board 31. The first terminal 33S and the second terminal 33T are electrically connected to the first contact 44S and the second contact 44T, respectively.

Each of symbols 50S, 50T, 51S depicts an L-shaped connector terminal which engages with and is fixed to the first connector 42 and has a tip end bent downward. A symbol 50S depicts a first connector terminal, 50T depicts a second connector terminal and 51S depicts a third connector terminal. The first connector terminal 50S and the third connector terminal 51S are electrically connected to the first contact 44S selectively, and the second connector terminal 50T is electrically connected to the second contact 44T.

The switch 40 according to the first embodiment of this invention is a kind of switch called a seesaw switch or a rocker switch. This switch controls the lighting of the light sources 32 by pushing the one end or the other end of the surface of the switch knob 41 (see a curved arrow in FIG. 1A). For example, this switch can switch the turning-on/off, brightness and emission color etc. of each of the light sources 32. In the embodiments of this invention, the explanation will be made only as to the turning-on/off of the light sources 32 in order to facilitate the explanation.

<Assembling of Respective Constitutional Components>

Figure 2B:
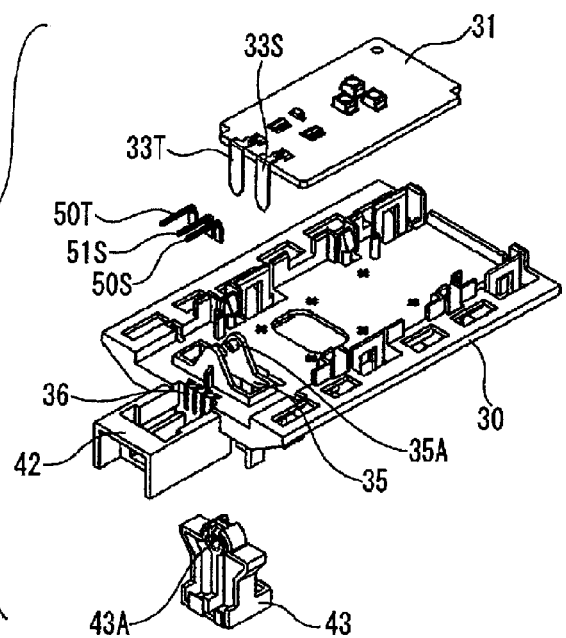
FIG. 2B is an exploded perspective view of the switch and the circuit board shown in FIG. 1A.

Next, the assembling states of the respective constitutional components will be explained based on exploded perspective views shown in FIGS. 2A and 2B.

The lens 21 is inserted into an opening portion 21A formed at the design portion 20 from the upper portion thereof and engaged with and fixed to the design portion 20. The switch knob 41 is inserted into a through hole 22 formed at the design portion 20 from the upper portion thereof. Then, the projection portion 22A of the through hole 22 engages so as to be rotatable freely with a supporting portion 41A provided at the side portion of the switch knob 41, whereby the switch knob 41 is assembled within the through hole 22.

On the other hand, the circuit board 31, to which the light sources 32 and the terminals 33S, 33T are fixed in advance, is engaged with and fixed to the function portion 30. In this case, the tip end of each of the terminals 33S, 33T penetrates through the function portion 30 and is placed in a state of being protruded on the rear surface of the function portion 30. The switch body 43 is inserted from the rear surface of the function portion 30 into an insertion hole 35 of an almost square shape formed at the side portion of the function portion 30 and is assembled within the insertion hole 35 in a manner that a projection portion 35A provided at the top portion of the insertion hole 35 engages so as to be rotatable freely with a rotation hole 43A formed near the head portion of the switch body 43. Further, the connector terminals 50S, 50T, 51S are engaged and fixed within a plurality of grooves 36 formed near the function portion 30 side of the first connector 42, respectively.

The design portion 20 and the function portion 30, to which the aforesaid respective components are attached, are assembled to thereby constitute the interior lamp 10 according to this embodiment.

<Interlocking of a Switch Knob and a Switch Body>

The interlocking of the switch knob 41 and the switch body 43 will be explained based on FIGS. 3A to 3C.

Figure 3A:
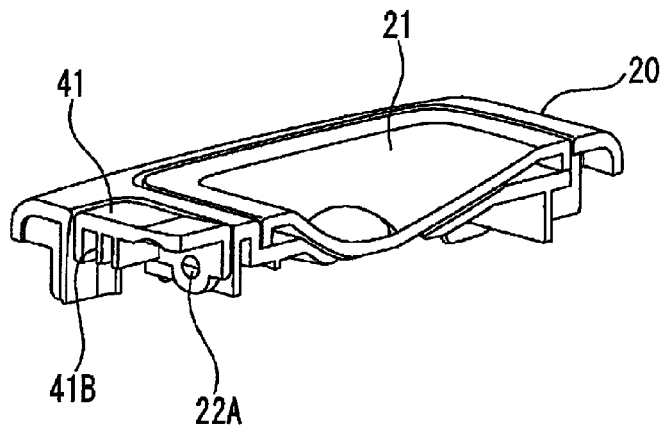
FIG. 3A is a sectional perspective view of a switch knob indicating the movement of the switch of the interior lamp shown in FIG. 1A.

When the switch knob 41 is attached to the design portion 20 so as to be rotatable freely, the switch knob 41 is placed in a state of being rotatable clockwise and counterclockwise around the projection portion 22A (see FIG. 3A).

Figure 3B:
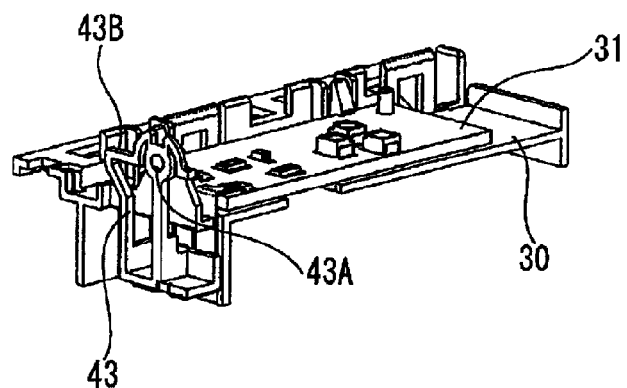
FIG. 3B is a sectional perspective view of a switch body.
Figure 3C:
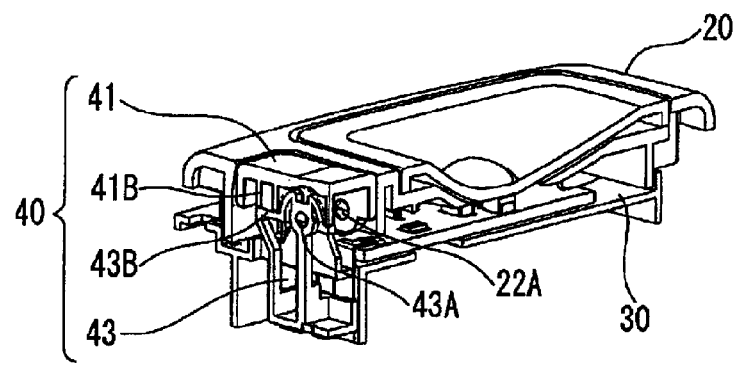
FIG. 3C is a sectional perspective view of the switch.

When the switch body 43 is attached to the function portion 30 so as to be rotatable freely, the switch body 43 is placed in a state of being rotatable clockwise and counterclockwise around the rotation hole 43A (see FIG. 3B).

When the design portion 20 and the function portion 30 are assembled, the tip ends of a plurality of projection portions 41B of the switch knob 41 protruding toward the bottom surface thereof abut against the flat portions 43B of the switch body 43 extending in the left and right directions from the upper portion thereof. Thus, since the projection portion 22A and the rotation hole 43A act as a common rotation center, the switch knob 41 and the switch body 43 are interlocked to thereby rotate the switch 40 in the left and right directions (see FIG. 3C).

The left and right directions are defined merely in order to explain the invention. That is, the directions perpendicular to the direction along the rotation shaft (the center of the projection portion 22A or the rotation hole 43A) are defined as the left and right directions and this definition is also used in the following explanation.

<Electrical Connection in a Switch and Arrangement of a Circuit Board>

Figure 4A:
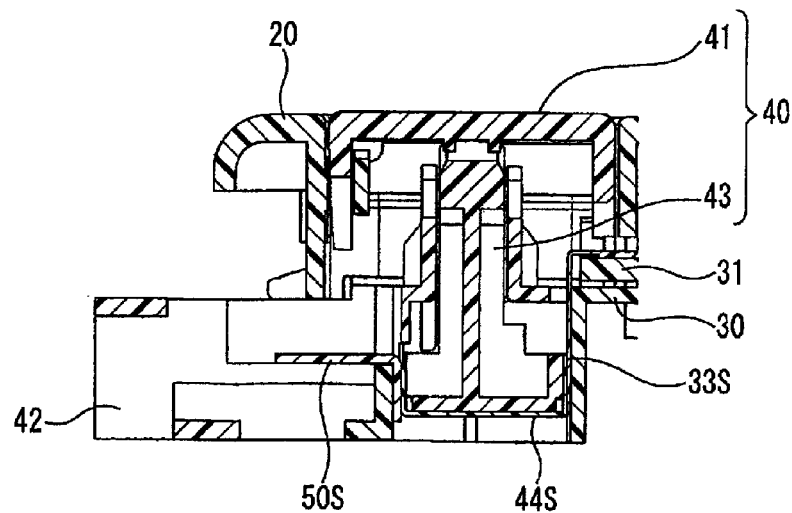
FIG. 4A is an enlarged sectional view of the switch indicating the electrical connecting states of the interior lamp shown in FIG. 1A.
Figure 4B:
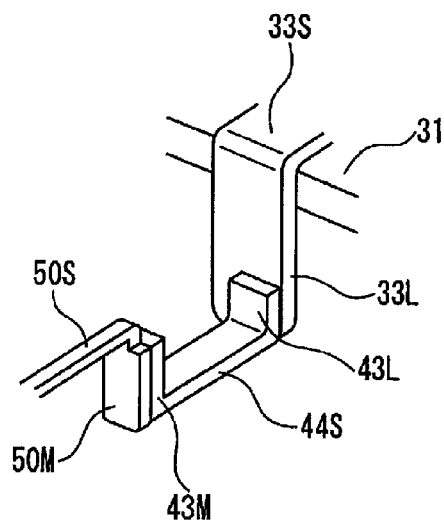
FIG. 4B is a perspective view of electrical connecting components indicating the electrical connecting states of the interior lamp.
Figure 4C:
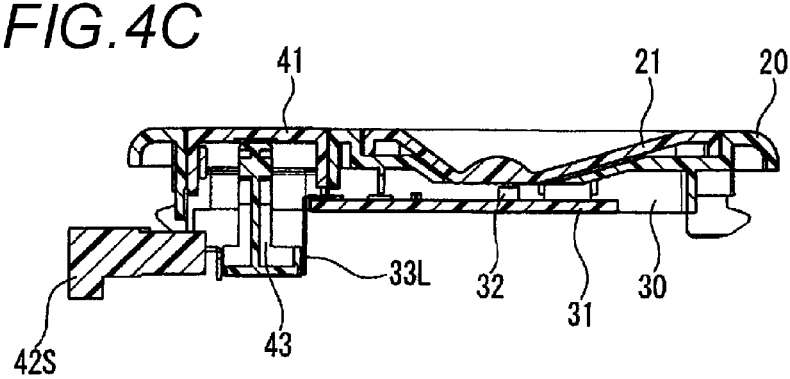
FIG. 4C is a longitudinal sectional view of the interior lamp.

The explanation will be made with reference to FIGS. 4A to 4C as to the electrical connection of the switch 40 and the arrangement of the circuit board 31 in a state that the design portion 20 and the function portion 30 are assembled.

When the design portion 20 and the function portion 30 are assembled, the first terminal 33S fixed to the side surface of the circuit board 31 and extended down therefrom is made contact with the one end of the first contact 44S attached to the bottom portion of the switch body 43, and the first connector terminal 50S engaged with and fixed to the first connector 42 is made contact with the other end of the first contact 44S. Accordingly, the first terminal 33S, the first contact 44S and the first connector terminal 50S are placed in an electrically connection state (see FIG. 4A).

This electrical connection will be explained in detail with reference to FIG. 4B.

A first terminal main body 33L, which is bent in the downward direction (elevational direction in the figure) perpendicular to the engaging/fixing direction of the circuit board 31 from the vicinity of the end portion of the circuit board 31, is provided at the first terminal 33S which is fixed to the circuit board 31 and electrically coupled to the circuit mounted on the circuit board 31. Also, rising portions 43L, 43M bent upward in the vertical direction are provided at the both ends of the first contact 44S, respectively. Further, a first connector terminal man body 50M bent downward in the vertical direction is provided at the first connector terminal 50S.

The first terminal main body 33L and the rising portion 43L are abutted to form an electrically connection state therebetween. Further, the first connector terminal man body 50M and the rising portion 43M are abutted to form an electrically connection state therebetween. In the concrete mode of this invention, a location where the circuit board 31 and the second connector 42S are electrically coupled locates beneath the position where the circuit board 31 is engaged and fixed. Also, the location where the contacts 44S, 44T fixed to the bottom portion of the switch body 43, which rotates in accordance with the switching of the switch 40, are moved locates beneath the position where the circuit board is engaged and fixed.

Next, the arrangement of the circuit board will be explained based on FIG. 4C.

The arrangement relation of the electrically connection state means that the movement of the switch 40 does not influence on the arrangement of the circuit board 31. To be concrete, since the electrical connection to the switch is performed only as to the first terminal main body 33L of the first terminal 33S which is extended down from the circuit board 31 engaged with and fixed to the function portion 30 and is in a still state, the movement of the switch 40 is independent from the engaging/fixing of the circuit board 31.

As a result, since the circuit board 31 can be selectively disposed at an optimum position with respect to the lens 21, the light sources 32 can be disposed at positions optically excellent as to the lens 21. In other words, since the circuit board 31 mounting the light sources 32 thereon can be engaged and fixed at the almost center portion of the function portion 30 in relation to the suitable arrangement with lens 21, the arrangement of the circuit board is not influenced by the movement of the switch 40 disposed at the side portion of the function portion 30.

Further, in recent years, according the requirement of the energy saving, the incandescent lamps having been known as general light sources have become difficult to be used and it has became necessary to use LEDs etc as light sources. In particular, such the tendency is remarkable as to the light sources for a vehicle. LEDs are also used as the light sources 32 in the interior lamp 10 of this invention. Since the LED is a light source having a flat shape, it is necessary to dose the surface of a lens (for example, a convex lens) to the light source at the time of the optical design using LEDs. In this point of view, the illumination into the room from the interior lamp 10 for a vehicle is made suitable by closely disposing the lens 21 and the light sources 32 in the embodiment.

<Technical Concept of the Switch in this Invention>

In the embodiment of this invention, the switch 40 is defined as being configured by the switch knob 41 and the switch body 43. In general, a usual switch is a device for electrically opening/closing an electrical circuit (Japanese dictionary "Koujien" published by Iwanami Shoten, Publishers.) and is configured by integrating a lever for switching the circuit and electrical connecting components for electrically opening/closing the electrical circuit. When considering in this point of view, it will be understood that the configuration shown in FIG. 4A corresponds to a switch as a whole in general terms.

That is, although it is necessary to provide electrical connecting components between the circuit board 31 and the power supply, the embodiment of this invention is excellent in an idea that the terminals 33S, 33T each extended down from the side portion of the circuit board 31 are used as the electrical connecting components. Further, another idea that the connector terminals 50S, 50T, 51S each engaged and fixed on the first connector 42 side are also used as a part of the electrical connecting components is a can't-miss matter. The aforesaid ideas led to this invention reduces the number of the components and improves the facility of the assembling procedure in the embodiment of this invention, to thereby provide the interior lamp 10 excellent in the cost performance.

Although the explanation is made as to the first terminal 33S, the first contact 44S and the first connector terminal 50S as the electrical connecting components, the others of the electrical connecting components are in the similar electrical connecting state and the detailed explanation thereof will be made clear based on FIGS. 5A to 5E and 6A to 6E.

<Movement and Electrical Connection of the Switch>

The explanation will be made based on FIGS. 5A to 5E and 6A to 6E as to the electrical connecting state of the terminals 33S, 33T, the contacts 44S, 44T and the connector terminals 50S, 50T, 51S with respect to the movement of the switch 40 according to this embodiment.

The lighting state of the light sources 32, that is, the turned-on state of the switch 40 will be explained with reference to FIGS. 5A to 5E. In this state, the surface of the left side of the switch knob 41 is pushed (see an arrow in FIG. 5B).

Figure 5A:
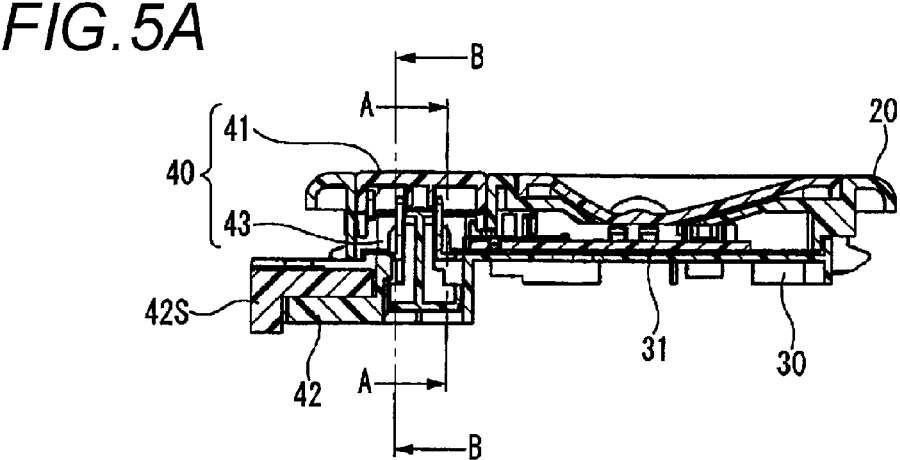
FIG. 5A is a longitudinal sectional view showing a turned-on state of the switch of the interior lamp shown in FIG. 1A.
Figure 5B:
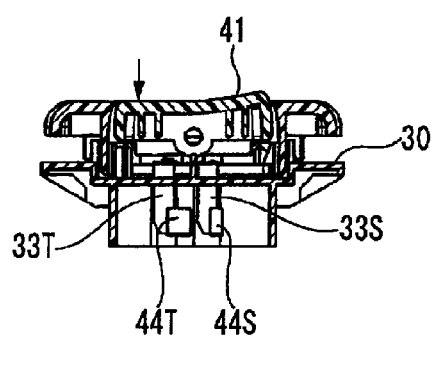
FIG. 5B is a sectional view along a line A-A of FIG. 5A.

The first terminal 33S contacts with the first contact 44S, and the second terminal 33T contacts with the second contact 44T (see FIG. 5B).

Figure 5C:
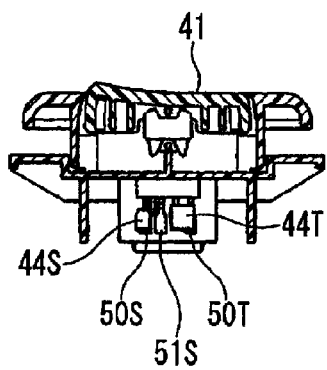
FIG. 5C is a sectional view along a line B-B of FIG. 5A.
Figure 5D:
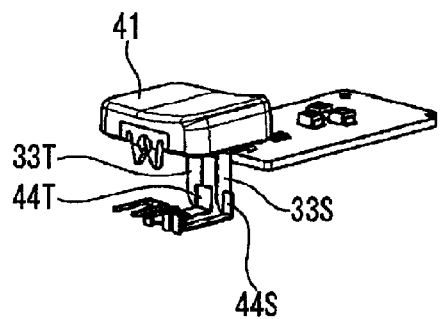
FIG. 5D is a perspective view showing the electrical connecting components.
Figure 5E:
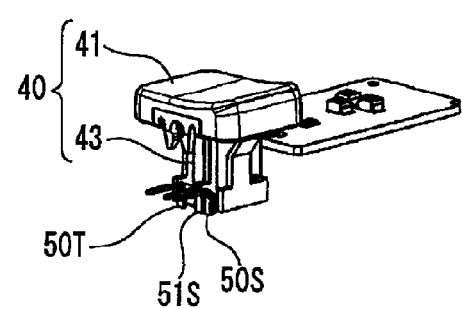
FIG. 5E is a perspective view of the switch.

The first contact 44S contacts with the first connector terminal 50S, and the second contact 44T contacts with the second connector terminal 50T (see FIG. 5C).

Thus, in the turned-on state of the switch 40, the first terminal 33S, the first contact 44S and the first connector terminal 50S are electrically coupled, and the second terminal 33T, the second contact 44T and the second connector terminal 50T are electrically coupled.

The non-lighting state of the light sources 32, that is, the turned-off state of the switch 40 will be explained with reference to FIGS. 6A to 6E. In this state, the surface of the right side of the switch knob 41 is pushed (see an arrow in FIG. 6B).

Figure 6A:
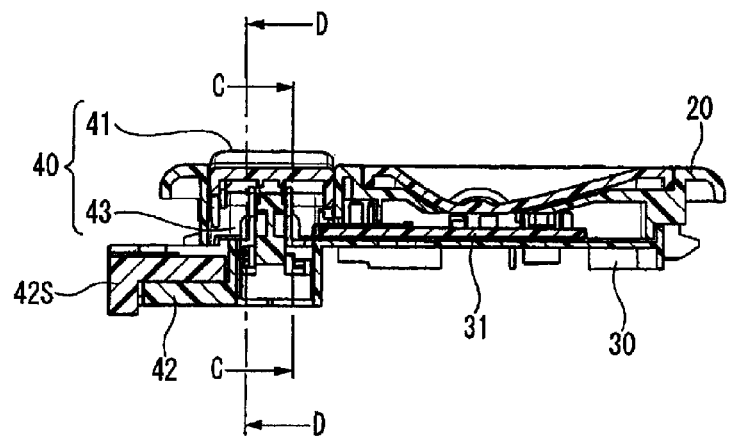
FIG. 6A is a longitudinal sectional view showing a turned-off state of the switch of the interior lamp shown in FIG. 1A.
Figure 6B:
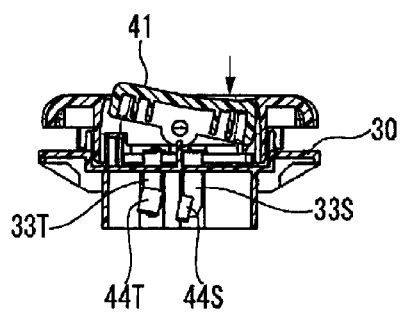
FIG. 6B is a sectional view along a line C-C of FIG. 6A.

The first terminal 33S contacts with the first contact 44S and the second terminal 33T contacts with the second contact 44T (see FIG. 6B).

Figure 6C:
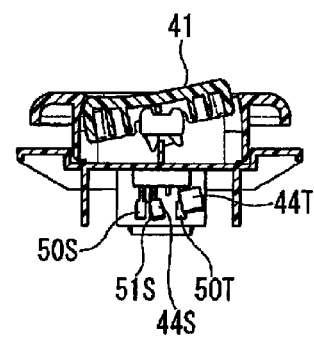
FIG. 6C is a sectional view along a line D-D of FIG. 6A.

The first contact 44S contacts with the third connector terminal 51S and the second contact 44T contacts with the second connector terminal 50T (see FIG. 6C).

Thus, in the turned-off state of the switch 40, the first terminal 33S, the first contact 44S and the third connector terminal 51S are electrically coupled, and the second terminal 33T, the second contact 44T and the second connector terminal 50T are electrically coupled. Further, since each of the contacts 44S and 44T moves in synchronous with the rotation of the switch 40, each of these contacts is electrically coupled in a slightly slanted state.

Further, since the first contact 44S is formed to have the narrow width which is almost same as the width in the transverse direction of each of the first connector terminal 50S and the third connector terminal 51S, the first contact 44S can be selectively coupled electrically to the first connector terminal 50S or the third connector terminal 51S in accordance with the movement of the first contact.

Second Embodiment

The interior lamp 10 for a vehicle according to the second embodiment of this invention will be explained based on FIGS. 7A to 7D.

In the second embodiment, the first connector 42 is formed in an integrated manner (including a state of being formed as a unit) at the lower portion of the switch body 43 interlocked with the switch knob 41. In other words, the switch 40 is configured by the switch knob 41, the switch body 43 and the first connector 42. The connector terminals 50S, 50T, 51S are engaged with and fixed to the first connector 42 from the rear portion side of the first connector 42. Further, the first terminal 33S is formed to have a narrow width, whilst the second terminal 33T is formed to have a width larger than that of the first terminal 33S.

This embodiment is same as the first embodiment in that the interior lamp 10 for a vehicle is configured by the design portion 20 and the function portion 30, the lens 21 is engaged with and fixed to the design portion 20, the switch knob 41 is assembled to the design portion 20 so as to be rotatable freely, and the circuit board 31 is engaged with and fixed to the function portion 30.

<Assembling and Electrical Connection in the Second Embodiment>

The assembling and the electrical connection of the second embodiment according to this invention will be explained based on FIGS. 8A to 8E.

The switch body 43 integrally formed with the first connector 42 is inserted into the insertion hole 35 of the almost square shape formed at the side portion of the function portion 30 and is assembled within the insertion hole 35 in a manner that the projection portion 35A provided at the top portion of the insertion hole 35 engages with the rotation hole 43A formed near the head portion of the switch body 43 so as to be rotatable freely (see FIG. 8A).

When the design portion 20 and the function portion 30 are assembled, the tip ends of the projection portions 41B of the switch knob 41 protruding toward the bottom surface thereof abut against the flat portions 43B extending in the left and right directions from the upper portion of the switch body 43. Since the rotation hole 43A (or the projection portion 22A) acts as a rotation center, the switch knob 41, the switch body 43 and the first connector 42 are interlocked to thereby rotate the switch 40 in the left and right directions (see FIG. 8B).

When the design portion 20 and the function portion 30 are assembled, the first terminal 33S fixed to the side surface of the circuit board 31 and extended down therefrom is made contact with the third connector terminal 51S engaged with and fixed to the first connector 42. As a result, the first terminal 33S and the third connector terminal 51S are placed in an electrically connection state (see FIG. 8C).

The first terminal 33S, which is fixed to the circuit board 31 and electrically coupled with a circuit mounted on the circuit board 31, is provided with the first terminal main body 33L which is bent in the downward direction (elevational direction in the figure) perpendicular to the engaging/fixing direction of the circuit board 31 from the vicinity of the end portion of the circuit board 31. Further, the third connector terminal 51S is provided with a third connector terminal main body 51M which is bent vertically in the upward direction. As a result, the first terminal main body 33L and the third connector terminal main body 51M are abutted to form an electrically connection state therebetween, whereby the second connector 42S and the circuit board 31 are placed in an electrically connection state therebetween. (see FIG. 8D).

In the concrete mode of the second embodiment according to this invention, a location where the circuit board 31 and the second connector 42S are electrically coupled locates beneath the position where the circuit board 31 is engaged and fixed. Also, the location where the connector terminals 50S, 50T, 51S fixed to the first connector 42, which is integrally formed with the switch body 43 that rotates in accordance with the switching of the switch 40, are moved locates beneath the position where the circuit board is engaged and fixed. Like the first embodiment, the arrangement relation of this electrically connection state means that the movement of the switch 40 does not influence on the arrangement of the circuit board 31.

Although the explanation is made as to the first terminal 33S and the third connector terminal 51S acting as the electrical connecting components, the other electrical connecting components are in the similar coupling states and the details thereof will be clear with reference to FIGS. 9A to 9H.

<Movement and Electric Connection of the Switch in the Second Embodiment>

The explanation will be made based on FIGS. 9A to 9H as to the electrical connecting state of the terminals 33S, 33T and the connector terminals 50S, 50T, 51S with respect to the movement of the switch 40 in the second embodiment according to this invention.

Figure 9A:
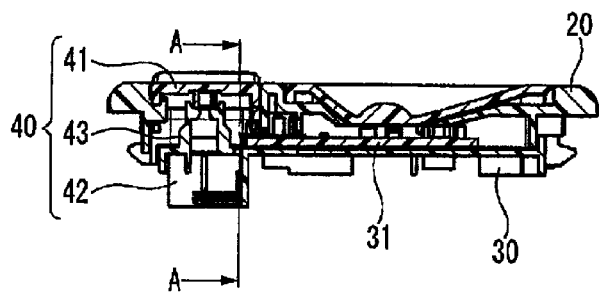
Figure 9B:
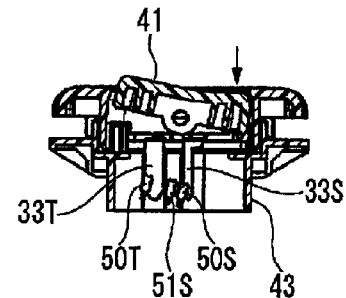
Figure 9C:
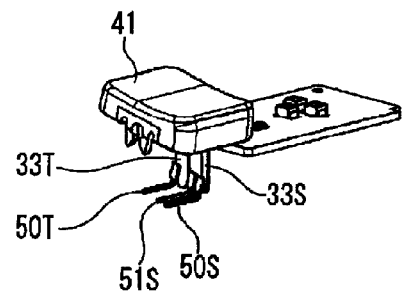
Figure 9D:
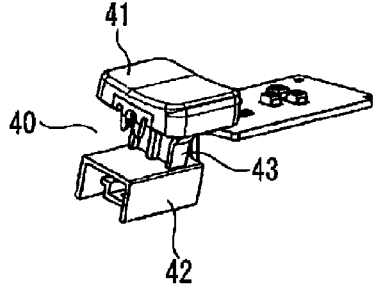
Figure 9E:
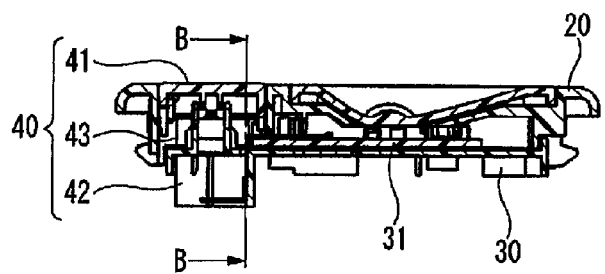

The explanation will be made in FIG. 9A as to the lighting state of the light sources 32, that is, the turned-on state of the switch 40. In this state, the surface of the right side of the switch 40 is pushed down (see an arrow in FIG. 9B), whereby the first terminal 33S contacts with the first connector terminal 50S and the second terminal 33T contacts with the second connector terminal 50T (see FIGS. 9B and 9C). Thus, in the turned-on state of the switch 40, the first terminal 33S and the first connector terminal 50S are electrically coupled, and the second terminal 33T and the second connector terminal 50T are electrically coupled. Further, since the connector terminals 50S, 50T, 51S move in synchronous with the rotation of the switch 40, each of these connector terminals is electrically coupled in a slightly slanted state.

The non-lighting state of the light sources 32, that is, the turned-off state of the switch 40 will be explained with reference to FIGS. 9E to 9H. In this state, the surface of the left side of the switch knob 41 is pushed (see an arrow in FIG. 9F).

Figure 9F:
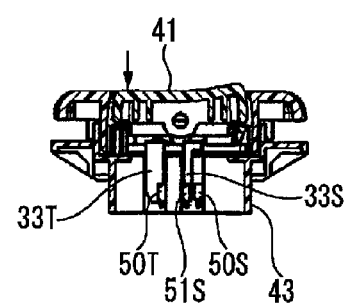
Figure 9G:
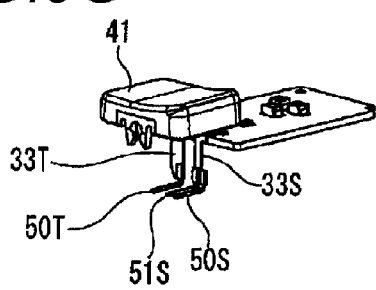
Figure 9H:
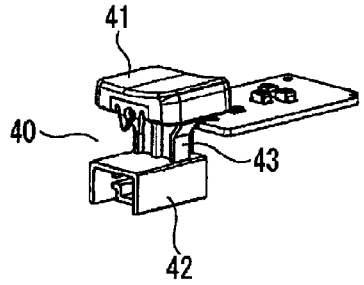

The first terminal 33S contacts with the third connector terminal 51S and the second terminal 33T contacts with the second connector terminal 50T (see FIGS. 9F and 9G). Thus, in the turned-off state of the switch 40, the first terminal 33S and the third connector terminal 51S are electrically coupled, and the second terminal 33T and the second connector terminal 50T are electrically coupled.

Further, the first terminal 33T is formed to have the narrow width which is almost same as the width in the transverse direction of each of the first connector terminal 50S and the third connector terminal 51S, each of the first connector terminal 50S and the third connector terminal 51S can be selectively coupled electrically to the first terminal 33S in accordance with the movement of the first connector terminal and the third connector terminal.

Third Embodiment

The interior lamp 10 according to the third embodiment of this invention will be explained based on FIGS. 10A to 10G.

The switch 40 of the third embodiment is a slide switch. The switch knob 41 is attached to the design portion 20 so as to be driven freely (hereinafter referred as movable freely in the third and fourth embodiments) in the horizontal direction (see an arrow of a straight line in FIG. 10A), and the switch body 43 is attached to the function portion 30 so as to be movable freely in the horizontal direction. When the design portion 20 and the function portion 30 are assembled, the switch knob 41 and the switch body 43 can be moved freely in the horizontal direction in an interlocked manner. In the third embodiment, like the first embodiment, the first connector 42 is integrally formed with the function portion 30. Since the configuration of the other components of this embodiment is same as that of the first embodiment, the explanation thereof is omitted.

The electrical connecting state of this embodiment is also same as that of the first embodiment.

Figure 10A:
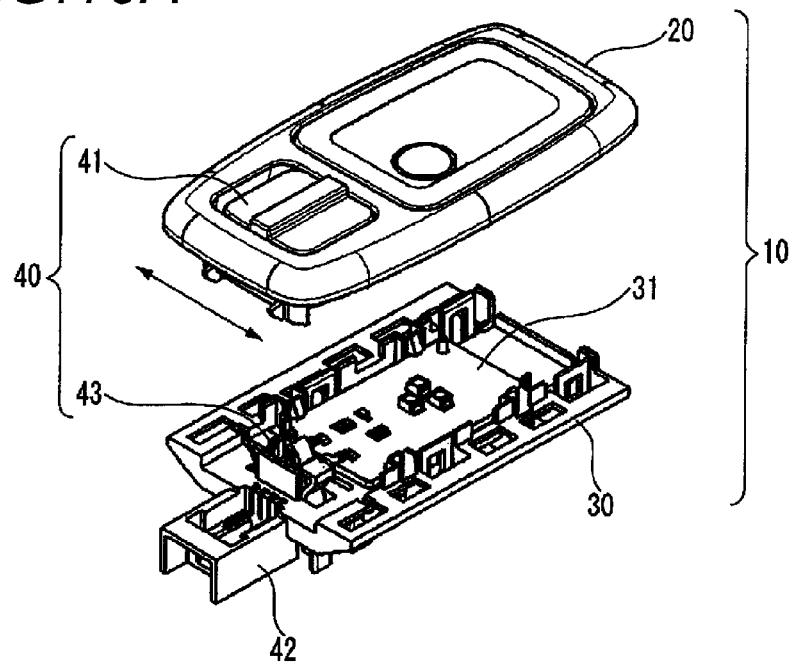
FIG. 10A is an exploded perspective view of the interior lamp according to a third embodiment.
Figure 10B:
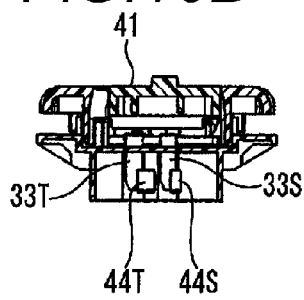
Figure 10C:
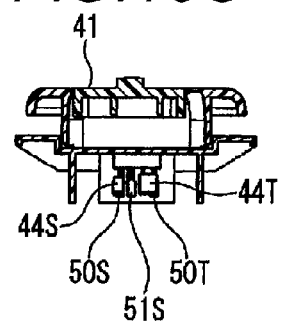
Figure 10D:
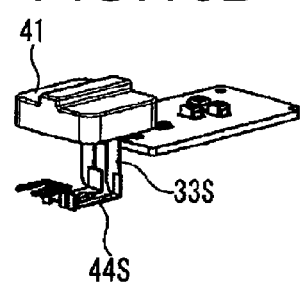

FIGS. 10B to 10D show that the switch 40 is in the turned-on state. That is, the first terminal 33S, the first contact 44S and the first connector terminal 50S are electrically coupled, and the second terminal 33T, the second contact 44T and the second connector terminal 50T are electrically coupled. Concerning the correspondence relation among the figures, FIG. 10B corresponds to FIG. 5B, FIG. 10C corresponds to FIG. 5C and FIG. 10D corresponds to FIG. 5D.

Figure 10E:
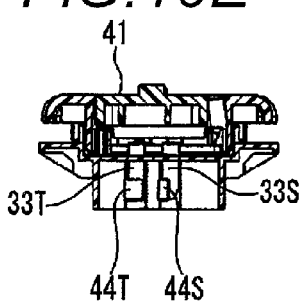
Figure 10F:
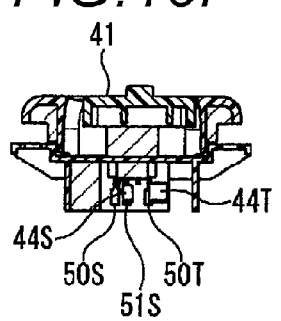
Figure 10G:
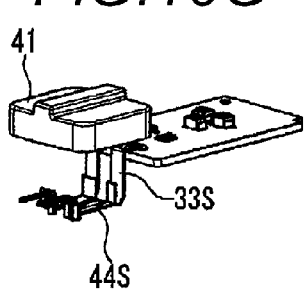

FIGS. 10E to 10G show that the switch 40 is in the turned-off state. That is, the first terminal 33S, the first contact 44S and the third connector terminal 51S are electrically coupled, and the second terminal 33T, the second contact 44T and the second connector terminal 50T are electrically coupled. Concerning the correspondence relation among the figures, FIG.

Figure 6D:
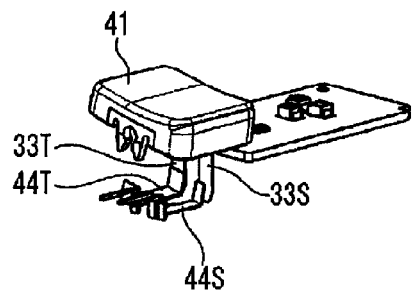
FIG. 6D is a perspective view showing the electrical connecting components.
Figure 6E:
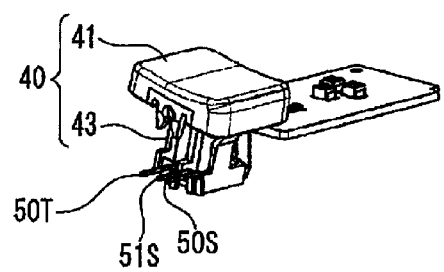
FIG. 6E is a perspective view of the switch.
Figure 7A:
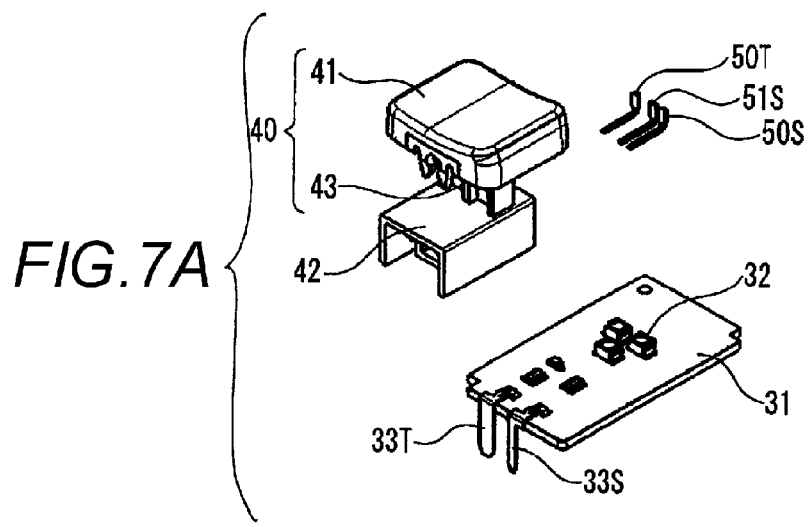
FIG. 7A is an exploded perspective view of a switch and a circuit board of the interior lamp according to a second embodiment of this invention.
Figure 7B:
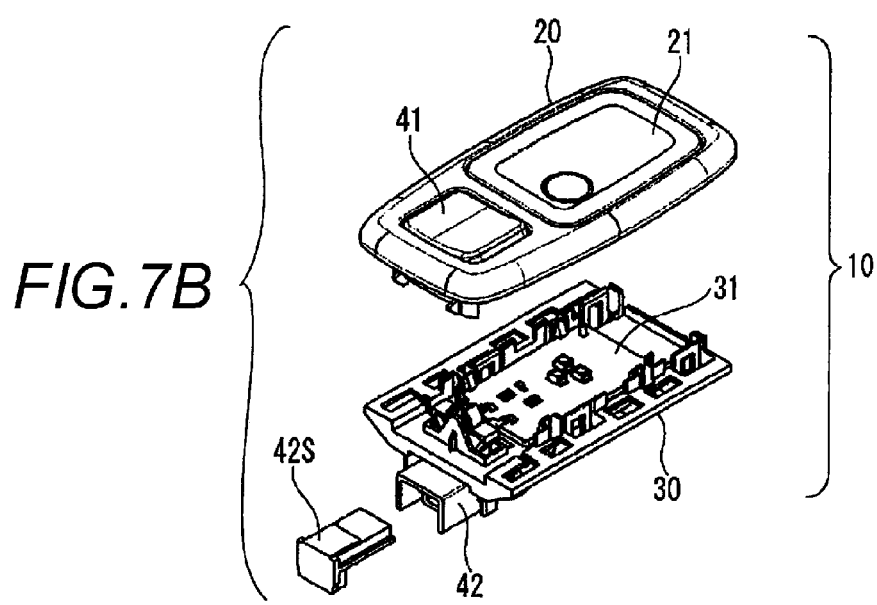
FIG. 7B is an exploded perspective view of the interior lamp according to the second embodiment.
Figure 7C:
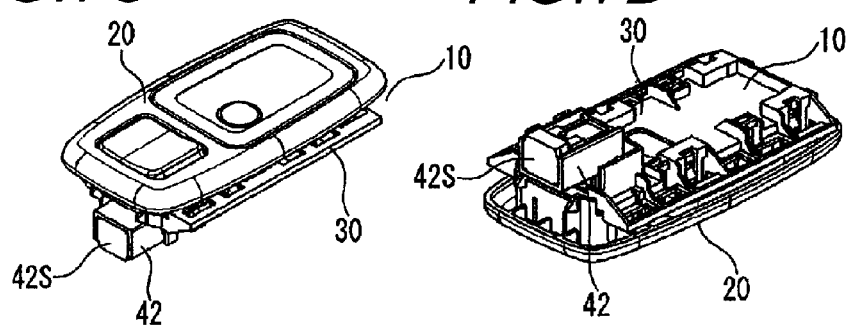
FIG. 7C is a perspective view of the front side of the interior lamp according to the second embodiment.
Figure 7D:
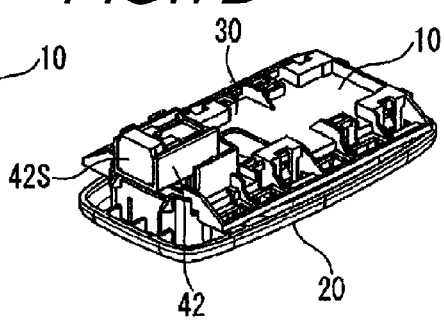
FIG. 7D is a perspective view of the rear side of the interior lamp according to the second embodiment.

10E corresponds to FIG. 6B, FIG. 10F corresponds to FIG. 6C and FIG. 10G corresponds to FIG. 6D.

Fourth Embodiment

The interior lamp 10 according to the fourth embodiment of this invention will be explained based on FIGS. 11A to 11E.

Figure 11A:
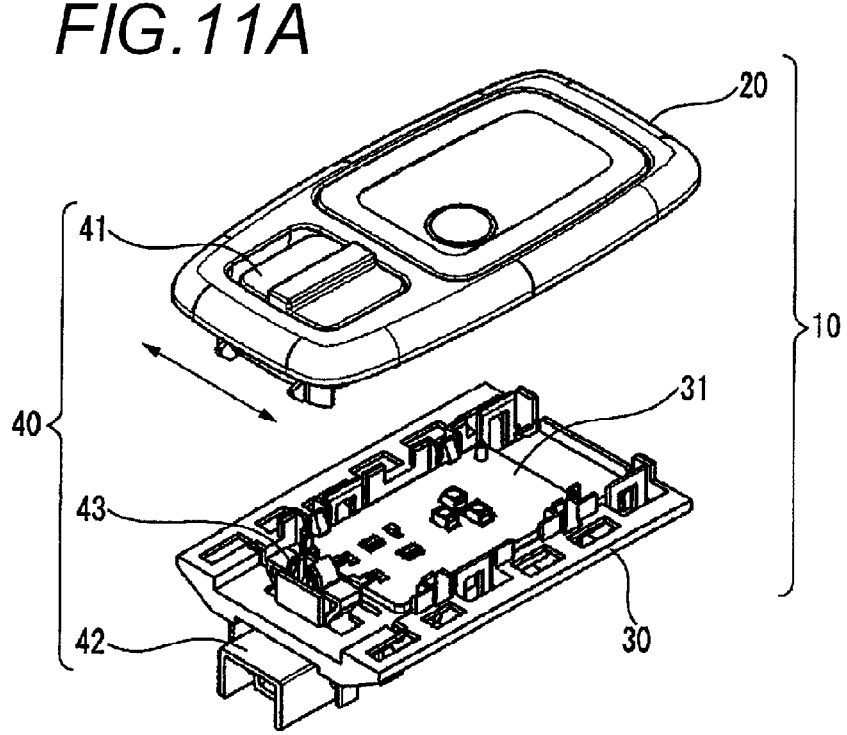
FIG. 11A is an exploded perspective view of the interior lamp according to a fourth embodiment.

The switch 40 of the fourth embodiment is a slide switch like the third embodiment (see an arrow of a straight line in FIG. 11A). When the design portion 20 and the function portion 30 are assembled, the switch knob 41, the switch body 43 and the first connector 42 become movable freely in the left and right directions in an interlocked manner. In the fourth embodiment, like the second embodiment, the first connector 42 is integrally formed with the switch body 43. Since the configuration of the other components of this embodiment is same as that of the second embodiment, the explanation thereof is omitted.

Figure 11B:
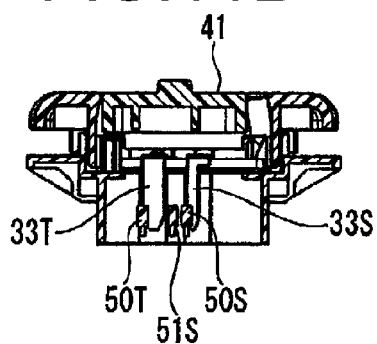
Figure 11C:
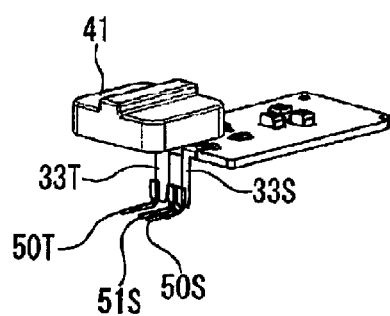

FIGS. 11B and 11C show that the switch 40 is in the turned-on state. That is, the first terminal 33S and the first connector terminal 50S are electrically coupled, and the second terminal 33T and the second connector terminal 50T are electrically coupled. Concerning the correspondence relation among the figures, FIG. 11B corresponds to FIG. 9B and FIG. 11C corresponds to FIG. 9C.

Figure 11D:
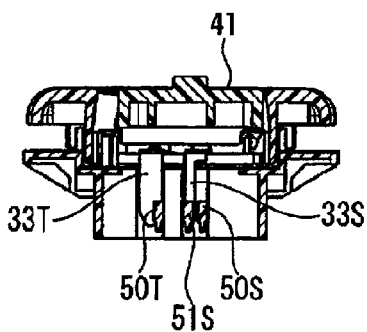
Figure 11E:
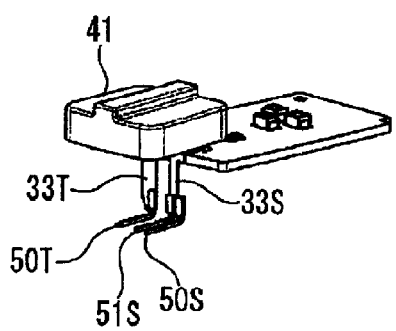

FIGS. 11D and 11E show that the switch 40 is in the turned-off state. That is, the first terminal 33S and the third connector terminal 51S are electrically coupled, and the second terminal 33T and the second connector terminal 50T are electrically coupled. Concerning the correspondence relation among the figures, FIG. 11D corresponds to FIG. 9F and FIG. 11E corresponds to FIG. 9G.

According to the interior lamp 10 as explained above, the lens 21 is engaged with and fixed to the design portion 20 and also the switch knob 41 is attached thereto so as to be driven freely. Further, the circuit board 31 mounting the light sources 32 thereon is engaged with and fixed to the function portion 30 and also the switch body 43 is attached thereto so as to be driven freely. A plurality of the terminals 33S, 33T each fixed to the side portion of the circuit board 31 and extended down therefrom and a plurality of the connector terminals 50S, 50T each fixed to the first connector 42 disposed on the side portion of the function portion 30 are electrically coupled selectively to perform the switching of the switch 40.

According to this configuration, the lens 21 and the switch knob 41 can be disposed on the design portion 20 side, whilst the switch body 43, the circuit board 31 and the first connector 42 can be disposed on the function portion 30 side, whereby the assembling procedure can be quite facilitated and the number of the components can be reduced. Further, since the switch knob 41, the switch body 43, the terminals 33S, 33T and the connector terminals 50S, 50T, 51S are disposed at the side portion of the circuit board 31 so as to be separated from the engaging/fixing position of the circuit board 31, the light sources 32 mounted on the circuit board 31 can be made dose to the lens 21, whereby the excellent interior illumination can be secured.

Further, since the terminals 33S, 33T and the connector terminals 50S, 50T, 51S act as the electrical connecting components incidental to the switch 40, the interior lamp 10 for a vehicle excellent in the cost performance can be provided without newly providing a switch on the market.

Further, since the switch body 43 and the first connector 42 are integrally formed, the number of the components can be reduced and the cost can be lowered.

Since a plurality of the contacts 44S, 44T are fixed to the bottom portion of the switch body 43, the terminals 33S, 33T and the connector terminals 50S, 50T, 51S are electrically coupled selectively via the contacts 44S, 44T. According to this configuration, since the switching of the switch 40 is performed by the contacts 44S, 44T, the number of the terminals 33S, 33T and the number of the connector terminals 50S, 50T, 51S explained in the embodiments can be selected freely.

Further, since the switch knob 41 is attached to the design portion 20 and the switch body 43 is attached to the function portion 30 each so as to be simultaneously and freely rotatable or movable in the horizontal direction, the switching means of the switch 40 can be changed in various manners.

Although the ordinal numbers of first and second etc. are used for some of the components such as the first connector 42 and the second connector 42S, the order of the ordinal numbers is not limited to the aforesaid embodiments and the order of the ordinal numbers may be reverse.

Although the embodiments are explained in the case of the two terminals 33S, 33T, the two contacts 44S, 44T and the three connector terminals 50S, 50T, 51S, the numbers and the arrangements of these electrical connecting components are not limited to the aforesaid embodiments so long as the effects and the object similar to those of this invention can be attained.

This invention is not limited to the aforesaid embodiments and the invention may be suitably modified and improved, for example. Further, the material, shapes, sizes, numerical values, modes, numbers, disposing positions etc. of the respective constituent elements of the aforesaid embodiments are not limited to aforesaid examples and may be selected arbitrarily so long as this invention is attained.

The present application is based on Japanese Patent Application No. 2011-031188 filed on Feb. 16, 2011, the contents of which are incorporated herein by reference.

INDUSTRIAL APPLICABILITY

According to this invention, an entire configuration of an interior lamp can be simplified and the improvement of the operability of the interior lamp can be realized.

REFERENCE SIGNS LIST 10 interior lamp
20 design portion
21 lens
21A opening portion
22 through hole
30 function portion
31 circuit board
32 light source
33S first terminal
33T second terminal
35 insertion hole
40 switch
41 switch knob
42 first connector
42S second connector
43 switch body
44S first contact
44T second contact
50S first connector terminal
50T second connector terminal
51S third connector terminal

The invention claimed is:

1. An interior lamp for a vehicle, comprising:
   a design portion;
   a function portion;
   a lens which is attached to the design portion;
   a circuit board which is attached to the function portion;
   a light source which is mounted on the circuit board so as to be close to the lens;
   a plurality of terminals which are mounted on a side portion of the circuit board so as to be extended down from the side portion of the circuit board;
   a connector which is disposed on a side portion of the function portion;
   a plurality of connector terminals which are provided on the connector; and
   a switch which has a switch knob and a switch body,
   wherein the switch knob is attached to a side portion of the design portion so as to be driven freely;
   wherein the switch body is attached to the side portion of the function portion so as to be driven freely; and
   wherein the switch knob and the switch body are operated in an interlocked manner to perform electrical connection between the terminals and the connector terminals selectively so as to perform a tuning on or off of the light source.

2. The interior lamp according to claim 1, wherein the switch body and the connector are integrally formed, and the switch knob, the switch body and the connector are operated in an interlocked manner.

3. The interior lamp according to claim 1, wherein a plurality of contacts are provided on a bottom portion of the switch body to electrically connect the terminals and the connector terminals via the contacts.

4. The interior lamp according to claim 1, wherein the switch knob is attached to the design portion so as to be rotatable freely, and the switch body is attached to the function portion so as to be rotatable freely.

5. The interior lamp according to claim 1, wherein the switch knob is attached to the design portion so as to be movable freely in a horizontal direction, and the switch body is attached to the function portion so as to be movable freely in the horizontal direction.

* * * * *